Figures 1, 2:
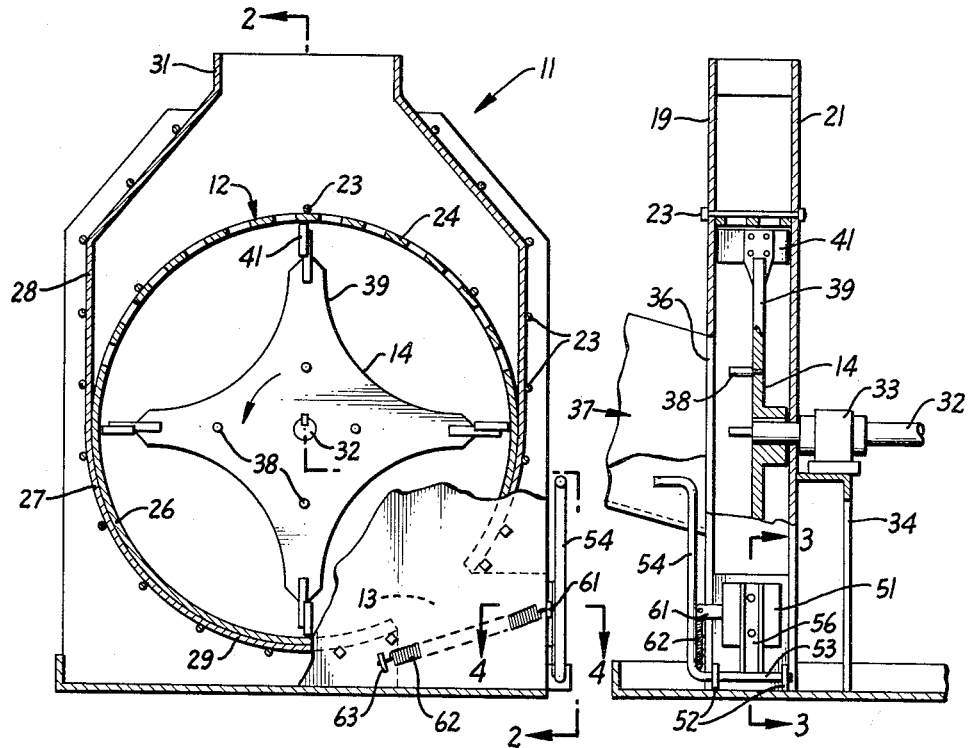

June 8, 1965  E. D. THOMPSON  3,187,792
FEED MILL HAVING FOREIGN MATERIAL TRAP CHAMBER
Filed July 22, 1963

INVENTOR.
EUGENE D. THOMPSON
BY
Schapp & Hatch
ATTORNEYS

United States Patent Office 3,187,792
Patented June 8, 1965

3,187,792
FEED MILL HAVING FOREIGN MATERIAL TRAP CHAMBER
Eugene D. Thompson, Rte. 7, Box 612, Modesto, Calif.
Filed July 22, 1963, Ser. No. 296,747
5 Claims. (Cl. 146—70.1)

The present invention relates to improvements in Feed Mills, and more particularly to feed mills having devices for catching and removing foreign material and debris from the material being ground.

Feed mills or pulverizers are used for comminution of agricultural products such as hay, straw, grain products, cottonseed cake, and the like. These products occasionally contain foreign material not reducible in the pulverizer; for example, nails, bolts, baling wire, small rocks, glass, etc.

Such debris can can create a fire hazard both from sparks within the mill as the debris is whirled inside and from the frictional heat such abrasion produces which raises the temperature of the finely ground feed product and thereby enhances likelihood of spontaneous combustion.

Foreign material in the mill also increases wear on all the interior surfaces of the machine by abrading, chipping and nicking action. The debris may also catch between the beaters on the rotor and the inside of the drum and cause breakage.

As the debris is not usually reducible in the mill, it cannot escape from the machine along with the comminuted product, especially when the discharge screen openings are small. Of course, if the foreign material is reduced in the mill and passes out with the comminuted feed through the screen, it causes a hazard to animals consuming the feed.

In the mill shown in U.S. Patent No. 2,309,326 to Miller, this problem was met by providing a hatch in the drum, closed by a gate which fitted flush with the interior surface of the drum. The gate was operated by a manual handle, but was locked closed by a ratchet mechanism when not opened by the operator. In the operation of that device, debris rattling in the drum would alert the operator, who would then open the gate and allow the foreign object to be thrown from the drum by centrifugal force. Problems were experienced with the device as shown in that patent, as debris flew out of the drum with great force when the hatch was opened, and a large amount of the ground feed product came out with it, creating a mess. Also, the successful operation of that device required constant attention to detect the presence of debris in the drum and to let it out quickly.

Accordingly, it is a principal object of the present invention to provide a feed mill which will remove from the operating area debris and foreign matter not reducible in the mill.

It is a further object of the present invention to provide a feed mill which utilizes a bed of comminuted feed product as a trap for foreign objects.

Another object of the present invention is to provide a feed mill which utilizes a bed of comminuted feed product as a cushion for relatively heavy foreign objects striking the bed.

A further object of the present invention is to provide a feed mill in which foreign objects are not required to be deflected by contact with mill structure before coming to rest in cushioning material.

A still further object of the present invention is to provide a feed mill of the character described wherein objects too large to be trapped by the bed of comminuted material can pass through the material and automatically escape the mill entirely.

Further objects and advantages of my invention will appear as the specification proceeds, and the new and useful features of the feed mill improvement will be fully defined in the claims hereto attached.

Figures 3, 4:
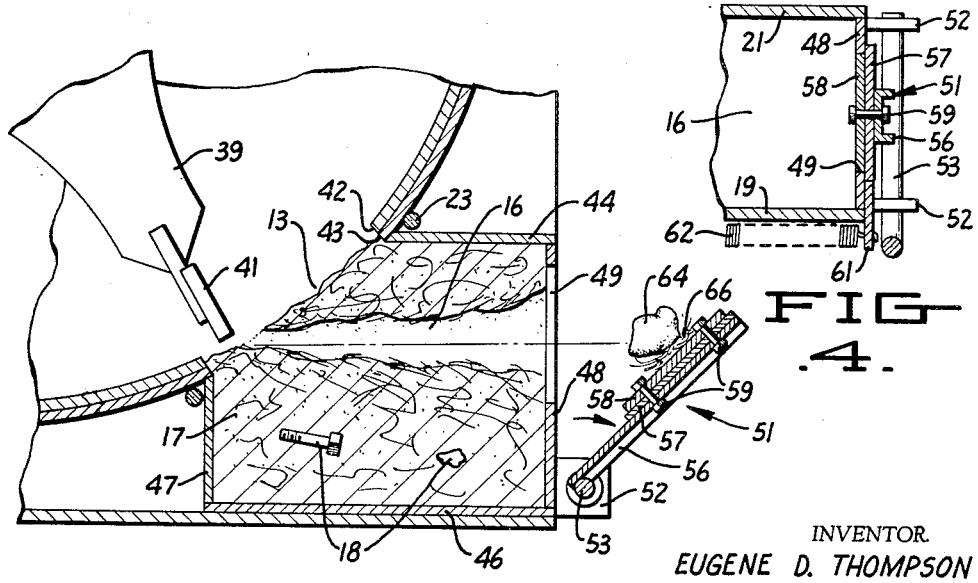

The preferred form of my invention is illustrated in the accompanying drawing, forming part of this application, in which:

FIGURE 1 is a side elevational view of a feed mill constructed in accordance with the present invention;

FIGURE 2, a vertical cross-sectional view taken along lines 2—2 of FIGURE 1;

FIGURE 3, an enlarged fragmentary vertical cross-sectional view taken along line 3—3 of FIGURE 2; and FIGURE 4, an enlarged fragmentary horizontal cross-sectional view taken along line 4—4 of FIGURE 1.

While I have shown only the preferred form of my invention, it should be understood that various changes or modifications may be made within the scope of the claims hereto attached, without departing from the spirit of the invention. The improvement of the present invention could be used with a wide variety of pulverizers, but is here illustrated as part of a mill constructed in accordance with the teachings of Elderkin Reissue Patent No. 21,523.

Referring to the drawings in detail, it will be seen that the feed mill 11 of the present invention comprises a cylindrical drum 12 having an opening 13 in the curved surface of the drum, a rotor 14 mounted to revolve in the drum for comminuting material therein, and walls 19, 21, 44, 46, 47 and 48 defining a chamber 16 communicating with opening 13. The chamber is adapted for receiving materials 17, 18 thrown through opening 13 by the rotor and is formed to contain a bed of comminuted material 17 for cushioning impact of relatively heavy objects 18 thrown through opening 13 and into the chamber by the rotor.

The ends of cylindrical drum 12 are closed by a front plate 19 and a rear plate 21 mounted on a base 22 in spaced parallel relation and interconnected by bolts 23 which serve both to hold the front and rear plates together and to support the drum 12 and the housing 27 mounted between the plates.

The drum 12 has a perforated upper section 24 and a lower section 26 which is imperforate except for opening 13. The drum is enclosed by a housing 27 consisting of a lower section 29 which conforms in contour to the lower section 26 of the drum, and an upper section 28 whose walls rise vertically from the sides of the drum and then constrict into a discharge structure 31.

The rotor 14 is mounted on an axial shaft 32 which projects into the drum through rear plate 21. The axial shaft is journaled in a bearing 33 which is supported on a standard 34. The shaft may be rotated by any suitable driving means.

A fairly large intake opening 36 is provided in front plate 19 with the center of the opening located approximately at the axis of the drum. A trough 37 is attached to front plate 19 to guide material into the opening.

Prongs 38 are provided on rotor 14, spaced varying distances from the axis but all within the radius of the intake opening 36. The rotor 14 is formed into radial arms 39, which terminate in transverse blades or beaters 41. The blades are located in the plane formed by the intersection of the diameter of the rotor and a line at right angles to the rotor diameter and at a slight angle skew to the horizontal axis.

Opening 13 is formed by an aperture 42 in the drum 12 and a corresponding aperture 43 in the housing 27. Opening 13 leads to a chamber 16 formed by front plate 19, rear plate 21, chamber top wall 44, chamber bottom wall 46, chamber inner side wall 47, and chamber outer side wall 48. The outer side wall 48 is provided with an opening 49 closed by a door indicated generally as 51.

Near the bottom on the outside of the chamber are attached two lugs 52. Journaled through these lugs is a pivot rod 53, which is bent upward and then outward to form a handle structure 54. Suitably attached to pivot rod 53 is a strap 56, which can be of channel shaped structure as shown. To the strap 56 are attached outer plate 57 and inner plate 58 by bolts 59.

Inner plate 58 is made to fit opening 49 fairly snugly, while outer plate 57 is slightly larger, to provide a better seal for the door 51 and to act as a stop for inward movement of the door around pivot pin 53.

To the outer plate 57 is attached a tab 61 which extends out beyond the front plate of the pulverizer to provide a mount for one end of a spring 62. The spring biases the door 51 to a closed position. The opposite end of the spring 62 is attached to a tab 63 mounted on the front plate 19 of the pulverizer.

In typical operation, feed material is fed into the pulverizer along trough 37. The prongs 38 on the rotor rip the forward end of the material, such as a bale of hay, and tear loose bunches of the material, which are then comminuted between the transverse blades or beaters 41 and the perforated upper section 24 of the drum. The comminuted material is discharged through discharge structure 31.

It can readily be seen that the chamber 16 will quickly fill with comminuted feed material 17. If a foreign object or piece of debris is introduced into the drum and is too large to pass out through the perforations in the upper section 24 of the drum, it can pass through the openings 13 and lodge in the chamber. If this happens, the impact of such an object lodging in the chamber will be cushioned by the comminuted feed material 17 collected in the chamber. The material 17 also serves to trap objects and prevent their return to the drum. Two such entrapped foreign objects are shown at 18 in FIGURE 3. To prevent damage to the pulverizer, it has been felt wise to make provision for the escape of larger pieces of debris from the pulverizer entirely. Such an object is shown in FIGURE 3 as 64, striking the door 51. If the object is of sufficient mass, it will be able to strike the door hard enough to overcome the spring 62, open the door 51 and escape the pulverizer entirely. A pad 66 of the comminuted material from the chamber is trapped between the object 64 and the door 51 to protect the door from damage.

The method of operation utilized with the gate as provided in U.S. Patent No. 2,309,326 may still be utilized with the present invention, as a handle 54 has been provided for manual operation of the door. The handle also serves to open the door for cleaning of the chamber.

With the construction of the present invention, the constant attention of the operator is not required, as smaller pieces of debris simply imbed themselves in the comminuted material contained in chamber 16, and larger pieces of debris can shoot through the chamber as is shown in FIGURE 3 and pass completely out of the mill. Furthermore, with the door arranged in this self-operating fashion, it is open only the length of time necessary to permit the object to escape, so that little of the feed material escapes with the object.

It should also be noted that in the present invention objects being ejected from the mill drum do not have to be deflected before coming to rest in cushioning and trapping material, so that their contact with the metal surfaces of the mill is a minimum. This serves to reduce wear, fire hazard and excess noise produced by such objects grinding against the interior of the mill drum, rotor and other metal parts of the mill.

The preferred location of the chamber is near the bottom of the pulverizer but it should be understood that it would also operate at other positions around the circumference of the drum. In its position as shown near the bottom, it gains advantage from the gravitational force, in that there is a tendency for material to move toward the bottom of the pulverizer despite the centrifugal force provided by the rotor.

From the foregoing, it will be seen that I have provided a novel improved feed mill which removes debris from the operating area of the drum by accumulating a pocket of comminuted feed material which tends to trap and cushion particles and objects which impinge on it. My pulverizer with a trap also provides automatic escape means located in the path of larger objects thrown from the drum into the chamber so that such objects may escape the mill entirely.

I claim:

1. A pulverizer comprising a cylindrical drum carried on a substantially horizontal axis and having an opening in the curved surface of said drum at one side of the bottom portion thereof, a rotor mounted to revolve in said drum for comminuting material therein, walls defining a chamber communicating with said opening in said drum and adapted for receiving material thrown in a substantially horizontal tangential path through said opening by said rotor, said chamber being formed to contain a bed of comminuted material positioned in said tangential path to trap and cushion the impact of relatively heavy objects thrown through said opening and into said chamber by said rotor, and a door communicating from said chamber to the outside of the pulverizer, said door being located in said tangential path.

2. In a pulverizer comprising a cylindrical drum having an opening for receiving tramp iron and the like in the curved surface of said drum and a rotor mounted to revolve in said drum for comminuting material therein, walls defining a chamber communicating with said opening in said drum and adapted for receiving tramp iron and like material thrown in a tangential path through said opening by said rotor, said chamber being formed to contain a bed of comminuted material positioned in said tangential path to trap and cushion the impact of relatively heavy objects thrown through said opening and into said chamber by said rotor, and a door communicating from said chamber to the outside of the pulverizer provided in a wall of said chamber located in said tangential path, said door being provided with means to bias it to a closed position, said means to bias the door being of sufficient strength to keep the door normally closed but to allow the door to open when excessively heavy objects are thrown into the opening and against the door.

3. A feed mill comprising:
   a rotor mounted to revolve around a horizontal axis and having radially extending arms, said arms terminating in beater blades for comminuting feed, said rotor having short projections extending axially from a face of the rotor;
   a cylindrical drum having its axis co-linear with said horizontal axis of said rotor, said drum being of relatively short axial width in relation to its diameter and having an opening substantially the axial width of said drum in the lower part of its curved surface, the upper half-cylinder of said drum being perforated and the lower half-cylinder being imperforate except for said opening, the inner surface of said drum being in close proximity to the path of travel of said beater blades;
   a housing surrounding said drum and providing a discharge conduit;
   means for feeding the material to be comminuted into said drum from one side against the face of said rotor having said projections;
   walls defining a relatively small substantially rectangular chamber truncated along one edge to conform to the contour of part of the lower surface of said drum, said chamber being adjacent to said drum and communicating with said opening in said drum, said chamber also being substantially the width of said opening and adapted for receiving material thrown in a tangential path through said opening by said rotor; and a door in a wall of said chamber located in said tangential path and communicating from said chamber to the outside of the mill, said chamber being proportioned to collect and contain a bed of comminuted material positioned in said tangential path between said opening and said door for cushioning the impact of foreign objects thrown into said chamber and trapping smaller objects in said bed, said door being provided with a hinge along its lower edge and a spring biasing the door to a closed position whereby relatively larger foreign objects can pass through said bed along said tangential path, knock open said door, and thereby escape the mill structure entirely.

4. In a pulverizer containing a cylindrical drum having a perforated upper drum section and an imperforate lower drum section, a rotor revolvable in the drum, an intake for the drum, means on the rotor whereby material fed through the intake is whirled against the drum and comminuted and discharged through the perforations, in combination, an improved tramp iron collector comprising walls defining a chamber adjacent to said lower drum section and on one side thereof, an opening in said lower drum section communicating to said chamber along the entire length of the drum and at a lower side position whereby material is forced from the drum into the chamber in a substantially horizontal tangential path, a trap door on said chamber located on a wall opposite the opening to the lower drum section and in position to receive direct impingement by heavy objects thrown tangentially through said opening, and spring means for biasing said door toward a normally closed position with a force sufficient to maintain the chamber generally closed but capable of opening upon excessive forces due to impingement thereon by heavy objects.

5. The pulverizer defined in claim 4, in which the door of the chamber is constructed of a pair of plate members, one of which fits into the opening in conformity with the wall framing the opening, and the other section being larger than said opening and providing proper positioning of the door when it is in closed position.

References Cited by the Examiner

UNITED STATES PATENTS

| | | | |
|---|---|---|---|
| 1,862,889 | 6/32 | Elzemeyer | 241—82 |
| 2,172,096 | 9/39 | Alfred | 241—82 XR |
| 2,309,326 | 1/43 | Miller. | |
| 2,344,591 | 3/44 | Bried | 241—82 XR |
| 2,488,799 | 11/49 | Bonnafoux. | |
| 2,940,676 | 6/60 | Brake | 241—82 |

J. SPENCER OVERHOLSER, *Primary Examiner.*